(12) United States Patent
Sakai et al.

(10) Patent No.: US 6,663,146 B1
(45) Date of Patent: Dec. 16, 2003

(54) SINGLE FLARE TUBE AND JOINT STRUCTURE OF SINGLE FLARE TUBE

(75) Inventors: Tomotsugu Sakai, Okazaki (JP); Hiroyuki Iguchi, Okazaki (JP); Toshihide Tanaka, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/693,820

(22) Filed: Oct. 23, 2000

Related U.S. Application Data (63) Continuation of application No. 09/389,593, filed on Sep. 3, 1999.

(30) Foreign Application Priority Data

Oct. 29, 1998 (JP) .......................................... 10-309189

(51) Int. Cl.[7] ................................................. F16L 19/00
(52) U.S. Cl. ................ 285/353; 285/148.26; 285/235; 285/253; 285/322; 285/328; 285/420; 285/903
(58) Field of Search ................................ 285/253, 322, 285/148.26, 235, 420, 903, 353, 328

(56) References Cited

U.S. PATENT DOCUMENTS

| 1,109,920 | A | * | 9/1914 | Glauber | 285/334.4 |
|---|---|---|---|---|---|
| 1,137,955 | A | * | 5/1915 | Dies | 285/386 |
| 1,804,814 | A | * | 5/1931 | Schultis | 285/334.5 |
| 2,306,702 | A | * | 12/1942 | Koerner | 285/226 |
| 2,952,481 | A | * | 9/1960 | Weatherhead, Jr. | 285/116 |
| 3,092,404 | A | * | 6/1963 | MacWilliam | 285/334.4 |
| 3,265,413 | A | * | 8/1966 | Currie | 285/334.4 |
| 3,393,930 | A | * | 7/1968 | Ziherl et al. | 285/334.4 |
| 3,751,002 | A |  | 8/1973 | Folkerts et al. |  |
| 3,833,984 | A | * | 9/1974 | Dietzel | 29/157 R |
| 4,842,310 | A | * | 6/1989 | Müffke et al. | 285/334.5 |
| 4,871,199 | A | * | 10/1989 | Ridenour et al. | 285/382.5 |
| 5,346,262 | A | * | 9/1994 | Liebig | 285/23 |
| 5,529,349 | A | * | 6/1996 | Gibbs et al. | 285/332 |
| 6,113,151 | A | * | 9/2000 | Beans | 285/23 |

FOREIGN PATENT DOCUMENTS

| DE | 4236323 A1 | * | 5/1994 |
| FR | 2465941 | * | 9/1980 |
| GB | 863390 | * | 3/1961 |
| JP | U-62-199577 |  | 12/1987 |
| JP | A-7-12274 |  | 1/1995 |

OTHER PUBLICATIONS

Technical Publication No. 97483 issued by Japan Automobile Manufacturing Associate, Dec. 26, 1997.

* cited by examiner

*Primary Examiner*—Robert J. Sandy
*Assistant Examiner*—Carlos Lugo
(74) *Attorney, Agent, or Firm*—Oliff & Berridge, PLC (57) ABSTRACT

A single flare tube, and a joint structure of the single flare tube makes a flare of the single flare tube hardly deformed plastically. Additionally, a tensile stress remains lower and is lower when the single flare tube is fastened. A joint structure of the single flare tube coupled with a union includes a single flare tube having a tube and a flare, a flare nut having a thread and a through-hole that receives the tube of the single flare tube, and a union having a thread for coupling with the thread of the flare nut. A width of a narrow inner circumferential groove of a radially outward extending part of the flare is substantially zero and stays substantially zero when the single flare tube is pushed against and coupled with the union by fastening the threads of the flare nut and the union together. Additionally, an internal diameter of the inner circumferential groove preferably is smaller than an external diameter of the tube. Furthermore, a curvature at a radially outer side of an outer corner of the single flare tube (where the tube is connected with the flare) is larger than a curvature at a radially inner side of the outer corner of the single flare tube along a longitudinal cut section of the single flare tube.

21 Claims, 7 Drawing Sheets

SINGLE FLARE TUBE AND JOINT STRUCTURE OF SINGLE FLARE TUBE

This application is a continuation of Ser. No. 09/389,593 filed Sep. 3, 1999.

BACKGROUND OF THE INVENTION

1. Field of Invention

The present invention relates to a single flare tube and to a joint structure of the single flare tube. The single flare tube includes a tubular portion and a flare portion attached to the front end of the tubular portion. The joint structure of the single flare tube includes the single flare tube, a flare nut and a union. The joint structure of the single flare tube can be used, for example, in a fluid circuit in order to connect one part of the fluid circuit to another part of the fluid circuit.

2. Description of Related Art

Figure 6:
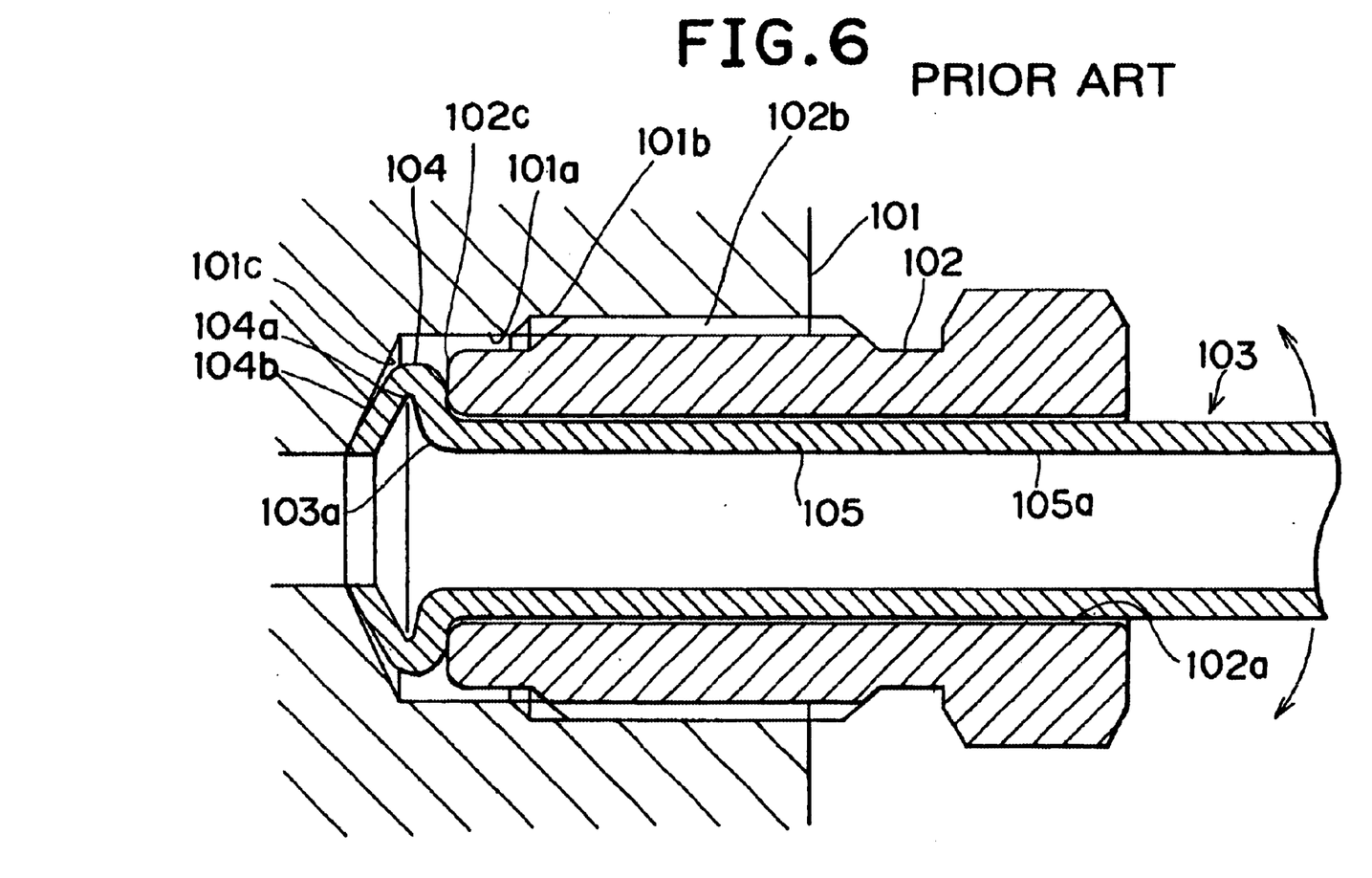
FIG. 6 is a longitudinal cross-sectional view of a prior art joint structure of a single flare tube.

A joint structure of a single flare tube is well known among several kinds of joint structures of tubes. One example of a joint structure of a single flare tube is shown in FIG. 6. With reference to FIG. 6, a cylindrical hole 101a is drilled into a union 101, and an internal thread 101b is cut in a part of the cylindrical hole 101a. An external thread 102b is cut in an outer peripheral surface of a flare nut 102, and the flare nut 102 is connected with the union 101 by screwing together the external thread 102b and the internal thread 101b. The flare nut 102 has a longitudinal through-hole 102a. A single flare tube 103 has a longitudinal through-hole 105a for flowing fluid, and includes a flare 104 and a tube 105. The tube 105 passes through the through-hole 102a of the flare nut 102. The flare 104 is positioned at the front end part of the single flare tube 103, and an outer peripheral circumference of the flare 104 extends radially outward. The outer diameter of the flare 104 progressively decreases closer to the front end of the flare 104, and thus a front slanting surface 104b of the flare 104 is nearly slant-shaped.

The flare nut 102 with the single flare tube 103 positioned in the through-hole 102a is inserted into the cylindrical hole 101a. When the flare nut 102 is tightened at the thread 101b of the union 101 and the thread 102b of the flare nut 102, the flare 104 is located between a front surface 102c of the flare nut 102 and a slant shaped inner wall 101c of the union 101, and the single flare tube 103 is coupled to the union 101.

In the above-mentioned joint structure of the single flare tube, the conventional type flare 104 has a longitudinal section shaped like Λ, and is elastically longitudinally deformed by tightening the threads of the flare nut 102 and the union 101. It had been thought that by this elastic deformation, the front surface 104b of the flare 104 could be tightly fitted to the interior wall 101c of the union 101.

Figure 7:
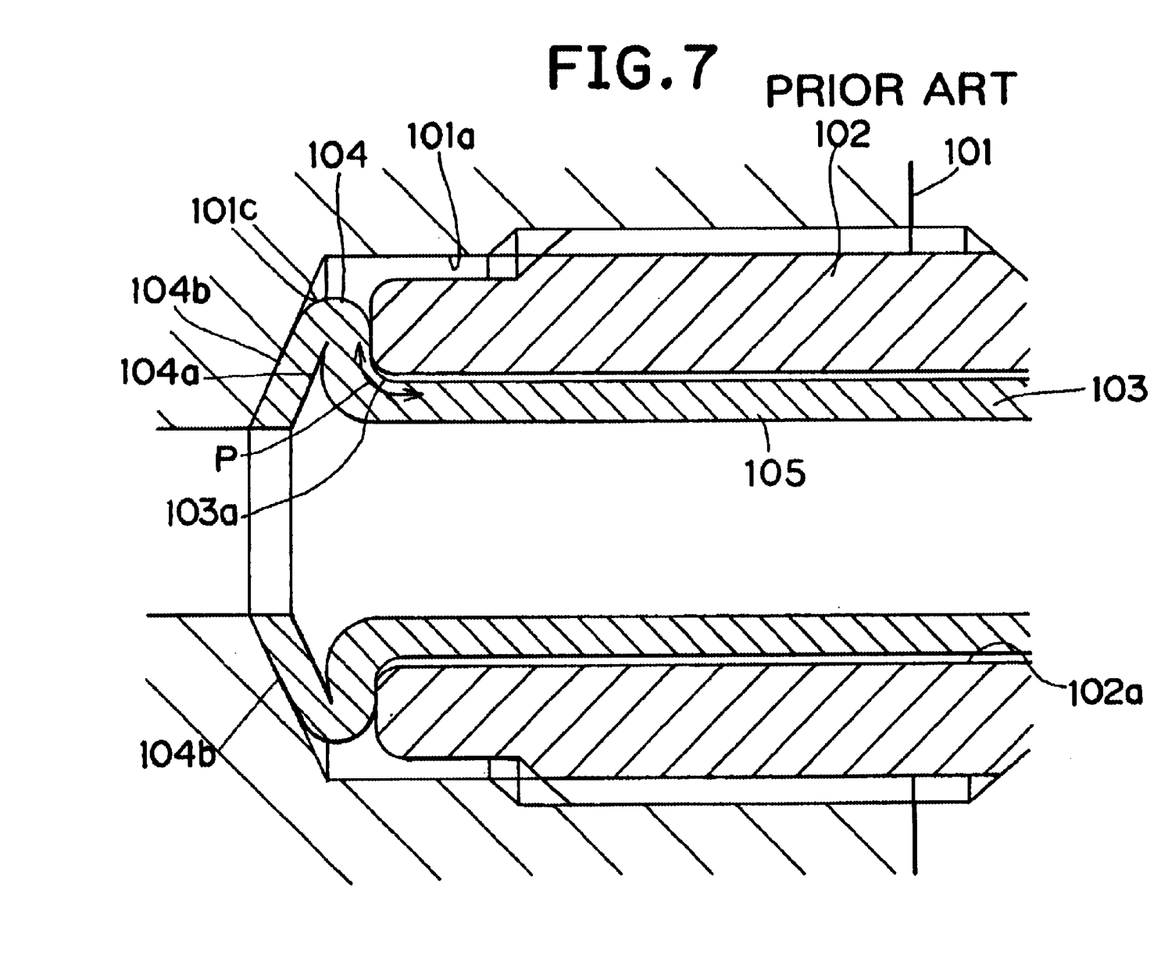
FIG. 7 is a longitudinal cross-sectional view of a joint structure of a single flare tube shown in FIG. 6, showing how the flare of the single flare tube is plastically deformed.

In actual practice, however, the flare 104 can be plastically deformed by excessive tightening of the flare nut 102, as illustrated in FIG. 7. An inner circumferential groove 104a of the flare 104 then becomes out of shape, and not only the front end of the front surface 104b, but also the whole slanted, front surface 104b could contact the interior wall 101c of the union 101. In this case, since the contact area between the flare 104 and the interior wall 101c increases, the contact pressure between both parts is reduced. Then, the sealability of this area also decreases.

Furthermore, a phenomenon by which the flare 104 rotates together with the flare nut 102 (called dual-rotation) could happen in the condition where the flare 104 is sandwiched and pushed between the front end of the flare nut 102 and the inner wall 101c of the union 101. If the flare nut 102 continues to be tightened until the flare 104 becomes out of shape completely and the gap of the inner circumferential groove 104a becomes substantially zero (as shown in FIG. 7), a rotation angle of the flare 104 by this dual-rotation could become a non-negligible level. As a consequence, the single flare tube 103 could twist by an amount that can not be neglected.

In order to prevent the single flare tube 103 from rotating with the flare nut 102, low friction oil (for example, vegetable-based rust preventive oil) could be placed on the external thread 102b and the front surface 102c of the flare nut 102. In this case, however, an oil coating process is necessary which increases the cost. If the low friction oil accidentally happens to be placed on the front surface 104b, the friction between the front surface 104b and the inner wall 101c is lowered. Then, the flare 104 could be slippery to the inner wall 101c, which results in the dual-rotation of the flare 104 and the flare nut 102. Consequently, the twisting angle of the single flare tube 103 could become higher.

Furthermore, in the case where the union 101 is surface-coated, the inner wall 101c must be masked in order to avoid being surface-coated and to prevent the friction between the slanting surface 104b and the inner wall 101c from becoming lower, and to prevent the flare 104 from rotating with the flare nut 102. Since the masking process is necessary, it causes the cost to increase and the reliability to be lowered.

On the other hand, a curvature of an outer (radially outward facing) corner 103a located between the front end of the tube 105 and the rear end of the flare 104 is constant and high. In the case that the curvature of the outer corner 103a is high, a high tensile stress P is loaded to the surface of the outer corner 103a when the flare nut 102 is tightened firmly, and the tensile stress P on the outer corner 103a remains after fastening the single flare tube 103 to the union 101 with the nut 102. At the outer corner 103a the fatigue strength of the single flare tube 103 becomes lower when the tensile stress P remains.

In addition, if the curvature of the outer corner 103a of the single flare tube is high, tensile stress tends to concentrate on the outer corner 103a when an external force places a further load on the single flare tube 103.

As mentioned above, if the curvature of the outer corner 103a is high, the tensile stress P tends to remain and concentrate. Consequently, if a vibration adds to the single flare tube 103, for example, it is not easy to ensure the durability of the single flare tube 103 at the outer corner 103a.

SUMMARY OF THE INVENTION

It is thus one object of the present invention to solve the aforementioned problem. Another object of the invention is to provide a single flare tube and a joint structure of the single flare tube in which a flare is not easily plastically deformed and a tensile stress does not easily remain.

According to one aspect of the invention, a joint structure of a single flare tube includes a single flare tube, a first connector member and a second connector member. The single flare tube includes a tube and a flare, and the flare is coupled with the tube at the front end of the tube. The flare extends radially outward relative to a longitudinal axis of the tube. The first connector member can be, for example, a flare nut that has a through-hole for receiving the tube of the single flare tube. The second connector member can be, for example, a union that is connectable with the first connector member. The flare nut and the union can have, for example, threads that engage each other. A width of a narrow inner circumferential groove of the outer radially extending part of the flare does not substantially change when the single flare tube is pushed and coupled with the union by coupling the flare nut with the union.

Since the width of the narrow inner circumferential groove formed inside of the flare is not substantially changed when the single flare tube is pushed against the union by the flare nut, according to the present invention, the flare does not deform plastically, and a contacting area between a front slanting surface of the flare and an inner wall formed inside of the union does not increase. Accordingly, the contacting pressure between the slanting surface of the flare and the inner wall of the union does not decrease after tightening the flare nut with the union.

Furthermore, according to another aspect of the present invention, the width of the narrow inner circumferential groove is substantially zero starting at a point that is radially closer to the longitudinal axis of the tube than is the external diameter of the tube. The narrow portion of the groove extends radially outward, and stays substantially zero when the single flare tube is pushed against and coupled with the union by connecting the flare nut with the union.

Since the single flare tube having the flare formed with the above-mentioned narrow inner circumferential groove is not easily deformed plastically, the flare does not deform plastically and a contacting area between a front slanting surface of the flare and an inner wall formed inside of the union does not increase. Accordingly, the contacting pressure between the slanting front surface of the flare and the inner wall of the union does not decrease after tightening the flare nut with the union.

Furthermore, according to another aspect of the present invention, a curvature at the (radially) outer side on the outer corner of the single flare tube is greater than a curvature at the (radially) inner side on the outer corner of the single flare tube on a longitudinal cut section. When a vibration is transmitted to the single flare tube by an external force, an outer corner between the front end of the tube and the rear end of the flare becomes deformed. As a consequence, a crack could occur on the corner if a high tensile stress remains on the corner. With this aspect of the present invention, however, since the curvature at the inner side on the outer corner of the single flare tube on the longitudinal section, where the greater stress is loaded by external force, is smaller, a tensile stress concentration is lower. Consequently, a crack does not occur easily on the single flare tube.

BRIEF DESCRIPTION OF THE DRAWINGS

The above and other objects, features, advantages and technical and industrial significance of this invention will be better understood by reading the following detailed description of a presently preferred embodiment of the invention, when considered in connection with the accompanying drawing, in which.

DETAILED DESCRIPTION OF PREFERRED EMBODIMENTS

Figure 1:
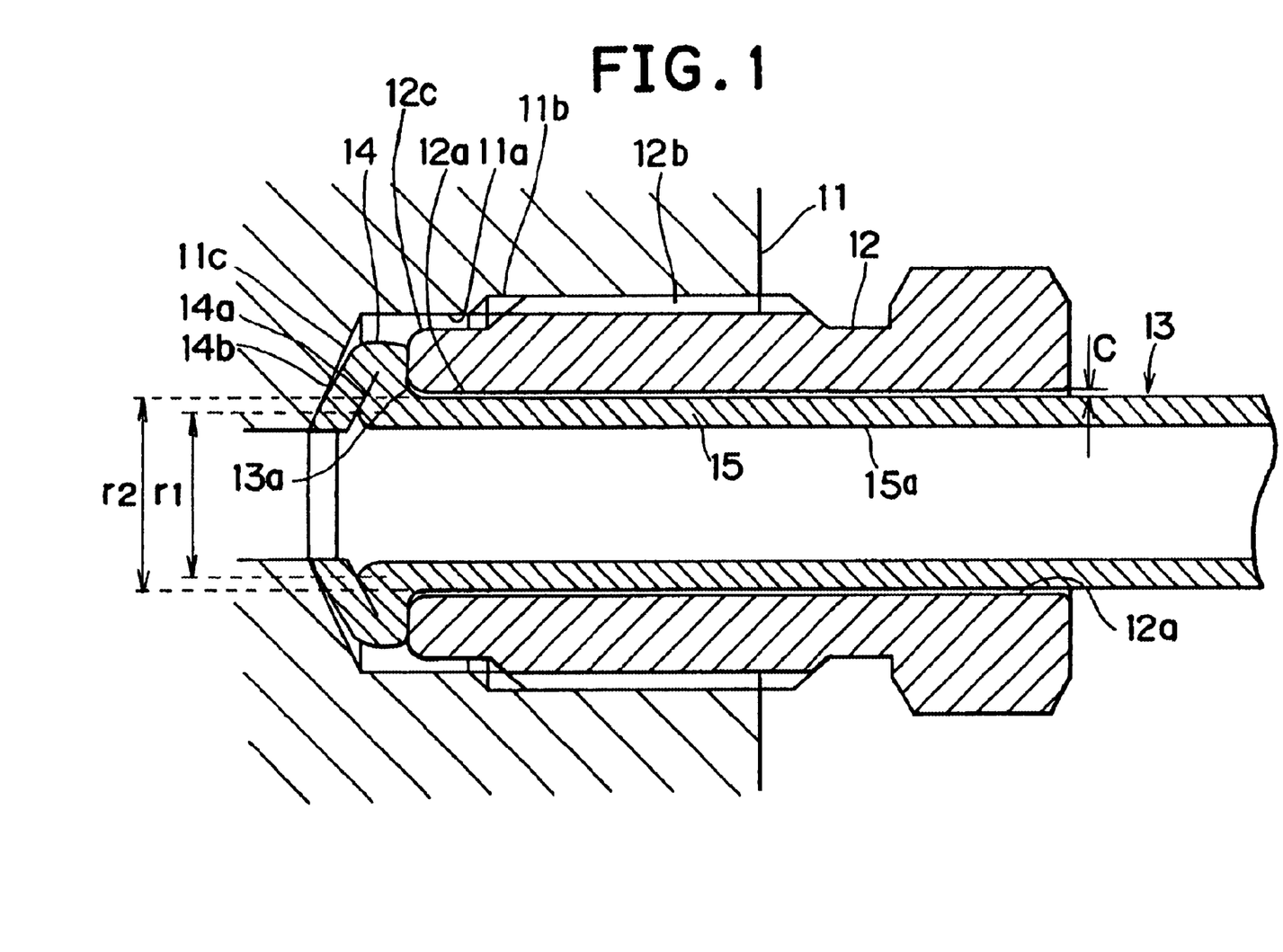
FIG. 1 is a longitudinal cross-sectional view of a joint structure of a single flare tube according to one embodiment of the present invention.

In the following description and the accompanying drawings, the present invention will be described in more detail in terms of specific embodiments. FIG. 1 shows a longitudinal cross-sectional view of one embodiment of the present invention. In FIG. 1, a cylindrical hole 11a is drilled inside a union 11, and an interior thread 11b is cut in a part of the cylindrical hole 11a. The union 11 is not limited to the type shown in FIG. 1, and any type of member which is connectable with a flare tube is meant to be encompassed by the term union. An external thread 12b is cut in an outer peripheral surface of a flare nut 12, and the flare nut 12 is coupled with the union 11 by screwing the external thread 12b and the internal thread 11b. The flare nut 12 has a longitudinal through-hole 12a. A single flare tube 13 has a longitudinal through-hole 15a for flowing fluid, and includes a tube 15 and a flare 14. The tube 15 passes through the through-hole 12a of the flare nut 12. The flare 14 is positioned at the front end part of the single flare tube 13, and an outer peripheral circumference of the flare 14 extends radially outward of the tube 15 relative to the longitudinal axis of the flare tube 13. The outer diameter of the flare 14 progressively decreases closer to the front side of the flare 14, and thus a front surface 14b of the flare 14 is nearly slant-shaped.

In the illustrated embodiment, a first connector member (the flare nut) has threads that engage with threads of a second connector member (the union). The invention is not limited to this type of connection structure. For example, the first and second connector members can attach to each other with a bayonet type of connection or a snap type of connection.

The flare nut 12 with the single flare tube 13 positioning in the through-hole 12a is inserted into the cylindrical hole 11a. When the flare nut 12 is tightened by the thread 11b of the union 11 and the thread 12b of the flare nut 12, the flare 14 is located between a front surface 12c of the flare nut 12 and a slant shaped inner wall 11c of the union 11, and the single flare tube 13 is coupled to the union 11.

Figure 2:
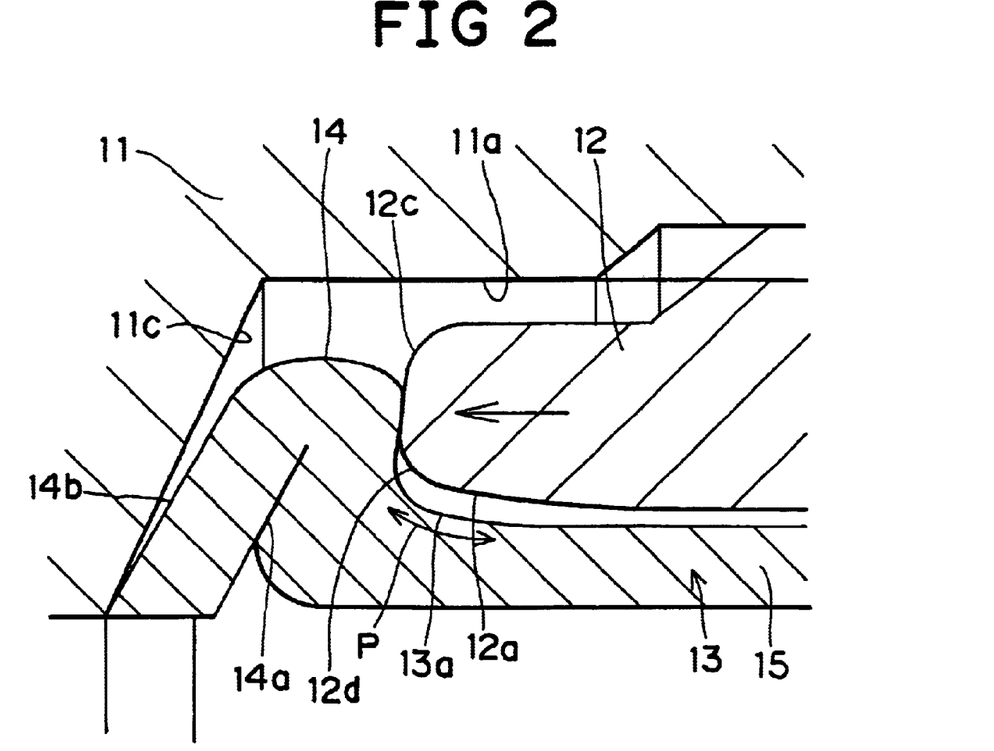
FIG. 2 is a magnified view of a part of FIG. 1, which includes a flare of the single flare tube and its periphery.

As depicted in FIG. 2 and mentioned above, the flare 14 extends radially outward at the front end part of the single flare tube 13, and the flare 14 protrudes beyond the front portion of the tube 15, and has a tapered, slanted front end. An inner circumferential groove 14a is formed at the inside of the flare 14 (i.e., on an inner surface of the flare 14), and a width of the inner circumferential groove 14a is substantially zero (i.e., the walls of the flare 14 on each side of the groove contact or almost contact each other). As shown on FIG. 1, the width of the inner circumferential groove 14a is zero or substantially zero starting at a point that is radially closer to the longitudinal axis (the centerline) of the flare tube 13 than is the outer diameter of the tube 15. Thus, the internal diameter r1 of the narrow portion of the groove 14a is less than the external diameter r2 of the tube 15.

Figure 8:
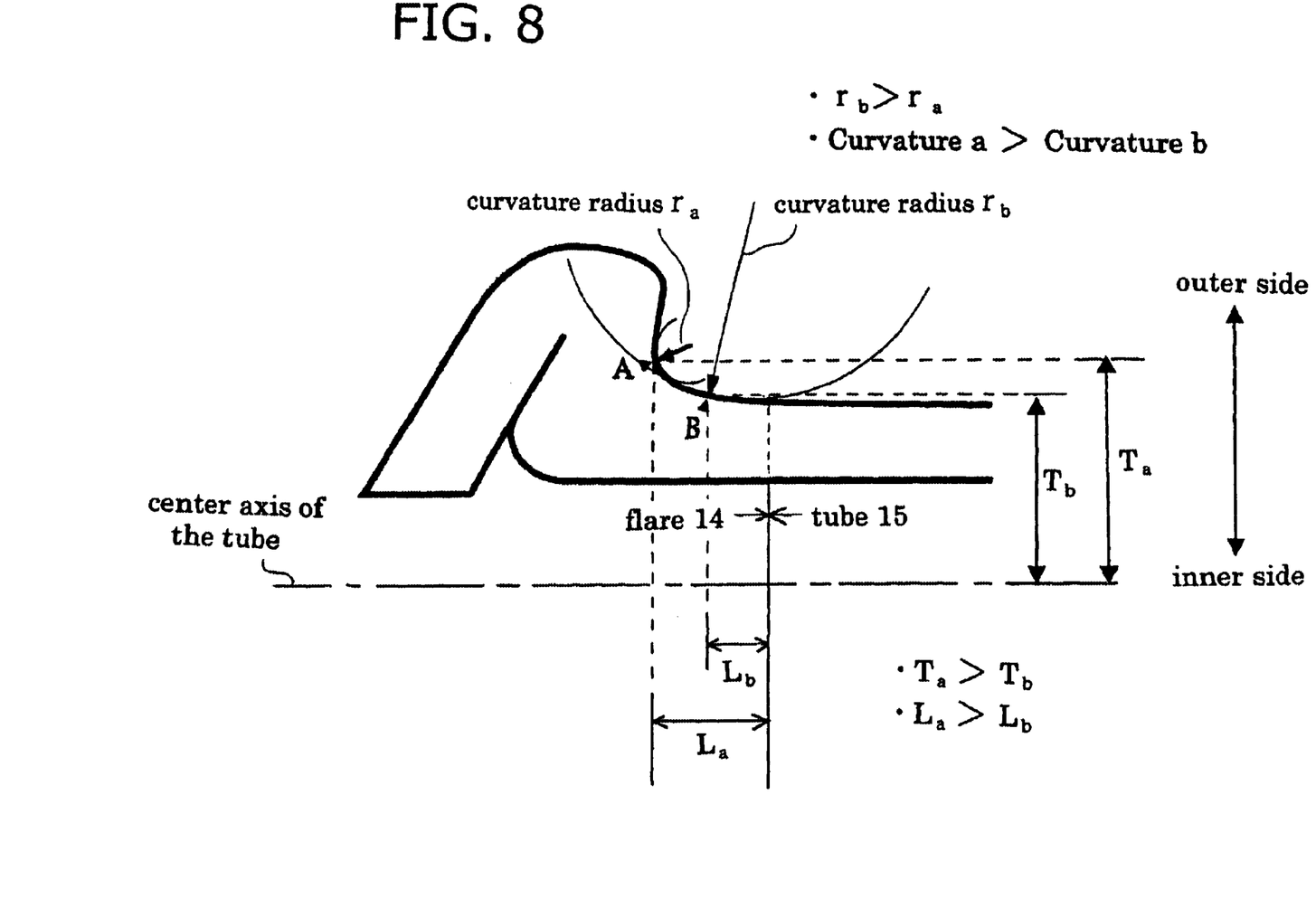
FIG. 8 is a longitudinal cross-section and magnified view of the single flare tube.

The rear side of the flare 14 connects gently and continuously to the front side of the tube 15. An outer corner 13a of the connecting part between the flare 14 and the tube 15 curves smoothly and continuously, and a curvature at the radially outer side of the outer corner 13a is greater than a curvature at the radially inner side of the outer corner 13a when viewed on a longitudinal cut section. See FIG. 8 showing that a curvature a of a point A, which is on the radially outer side of the outer corner 13a, is greater than a curvature b of a point B, which is on the radially inner side of the outer corner 13a. In other words, the curvature of the outer corner 13a of the single flare tube 13 is not constant, and the farther a part of the flare 14 is from the tube 15, the more sharply the outer corner 13a curves. On the contrary, the closer a part of the flare 14 is to the tube 15, the more gradually the outer corner curves. That is, a curvature at the radially outer side of the outer corner of the single flare tube 13 on a longitudinal cut section is greater than a curve at the radially inner side of the outer corner of the single flare tube 13. In other words, the radius of curvature of the outer corner 13 decreases (the curvature becomes tighter) from the tube 15 toward the flare 14. See FIG. 8 showing that a curvature radius $r_a$ of point A, which is farther from the tube 15, is smaller than a curvature radius $r_b$ of point B, which is closer to the tube 15 than the point A. Thus, the points along the curvature radius $r_b$ curve are at least as close to the centerline axis as the points along the curvature radius $r_a$ curve.

Furthermore, a curvature of an inner front corner 12d connecting a front surface 12c to the through-hole 12a of the flare nut 12 on a longitudinal cut section is not constant. As illustrated in FIG. 2, the more toward the front the inner front corner 12d is, the more sharply the inner front corner curves. On the contrary, the farther the inner front corner is from the front surface 12c, the more gradually the inner front corner curves. This shape of the flare nut 12 prevents the front surface 12c from intruding into the outer corner 13a, and, makes the contacting area between the front surface 12c and the outer rear surface of the flare 14 more inner side of the outer rear surface of the flare 14 (i.e., the portion of the back surface of the flare which is angled to face the tube 15 is contacted).

In the above-mentioned embodiment, since the width of the inner groove 11a is zero or substantially zero starting at a point that is radially closer to the longitudinal axis of the tube than is the outer diameter of the tube 15, the internal diameter r1 of the narrow portion of the inner groove 14a is smaller than the external diameter r2 of the tube 15. Due to this structure, a width of the narrow inner circumferential groove 14a inside the radially outward extending part of the flare 14 hardly varies (and is maintained at zero or substantially zero) when the flare 14 is pushed by the flare nut 12. Because the width of the inner groove 14a is substantially zero and stays substantially zero, though the single flare tube 13 is pushed and coupled with the union 11 by tightening the threads 11b, 12b of the union 11 and the flare nut 12, the inner circumferential groove 14a of the flare 14 does not change its shape by plastic deformation. Consequently, even if the slanting front surface 14b is strongly pushed against the inner wall 11c, the contacting area between the slanting surface 14b and the inner wall 11c does not increase. Accordingly, the contacting pressure of the area is maintained high and fluid inside of the single flare tube 13 and the union 11 does not leak. As used herein, substantially zero means that not only the width of the narrow part of the inner circumferential groove 14a is zero but also the width does not change substantially when the flare nut 12 is tightened strongly. The above-mentioned condition is satisfied by setting an appropriate outer diameter, an appropriate wall thickness, an appropriate material etc. of the single flare tube 13, or an appropriate shape of the flare 14 in which an internal diameter of the narrow part of the inner circumferential groove 14a is smaller than an external diameter of the tube 15.

Furthermore, since the flare 14 plastically deforms very little when the flare nut 12 is tightened strongly after the flare 14 is sandwiched between the front surface 12c of the flare nut 12 and the inner wall 11c of the union 11, an angle of the flare 14 rotated by the flare nut 12 changes very little. Accordingly, the single flare tube 13 does not twist substantially.

Moreover, it is not necessary to place low friction oil on the external thread 12b and the front surface 12c of the flare nut 12 in order to prevent the single flare tube 13 from rotating with the flare nut 12. Since the oil coating process can be eliminated, a cost saving is attained.

Furthermore, it is not necessary to prevent the inner wall 11c from being surface-coated, because the dual-rotation of the single flare tube 13 and the flare nut 12 is prevented without lower friction between the slanting surface 14b and the inner wall 11c. Therefore, an apprehension to reliability of the masking process is eliminated and a cost saving is attained.

Figure 3:
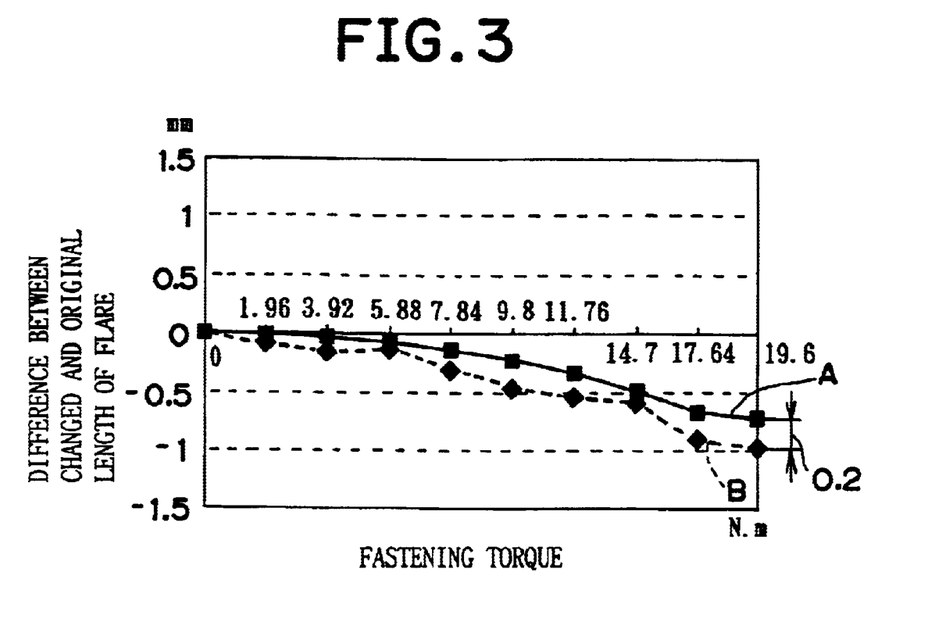
FIG. 3 is a graph showing a comparison between one embodiment of the present invention and the prior art, concerning a changing length of the flare when tightening a flare nut.

FIG. 3 is a graph showing a comparison of a change in length of the flare 14 when tightening the flare nut 12 between this embodiment and the aforementioned prior art. The horizontal line shows fastening torque and the vertical line shows a difference between the changed longitudinal length and the original length of the flare 14. The solid line A shows characteristics of the flare 14 of the joint structure of the single flare tube 13 of this embodiment, and the dotted line B shows characteristics of the flare 104 of the prior art. According to this graph, the length difference of the flare 14 of the embodiment changes less than the length difference of the prior art.

In the case that the slanting front surface 14b of the flare 14 is pushed against the inner wall 11c of the union 11 when the flare nut 12 is tightened strongly, the tensile stress P occurs on the surface of the outer corner 13a of the single flare tube 13. Because the outer corner 13a curves gradually from the front of the tube 15 to the rear side of the flare 14, a lower tensile stress P remains on the surface of the outer corner 13a. Additionally, because the curvature of the outer corner 13a is low, added tensile stress to the outer corner 13a hardly concentrates when an external force is loaded to the single flare tube 13. Therefore, the total tensile stress on the outer corner 13a becomes lower. Consequently, the fatigue durability of the outer corner 13a becomes higher, and the durability of the single flare tube 13 is obtained.

As mentioned above, the shape of the front surface 12c and the inner front corner 12d of the flare nut 12 is designed so that the contacting area between the rear outer surface of the flare 14 and the front surface 12c is closer to the tube 15. It is known from experiments that the above-mentioned characteristic makes the tensile stress P lower. Therefore, the outer corner 13a of the flare 14 can have an increased fatigue durability.

Furthermore, the shapes of the front surface 12c of the flare nut 12 and the rear outer surface of the flare 14 are designed so that the contacting area becomes larger. Consequently, the contacting pressure of this part is prevented from becoming too high.

Figure 4:
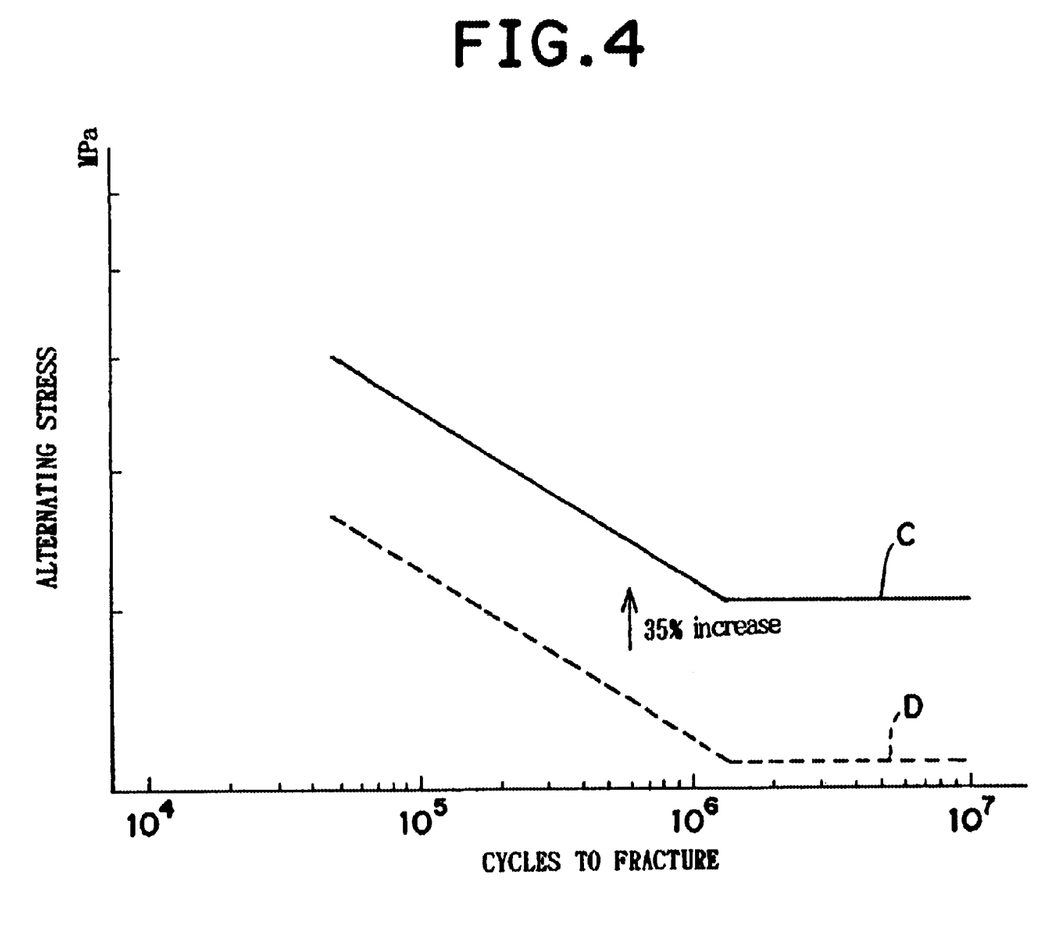
FIG. 4 is a graph showing alternating stress vs. cycles to fracture comparing fatigue durability of the single flare tube of one embodiment of the present invention and the prior art.

FIG. 4 is a graph showing alternating stress versus cycles to fracture, comparing fatigue durability of the single flare tube of one embodiment of the present invention and the prior art. In this graph, the horizontal line shows cycles to fracture of the single flare tubes, and the vertical line shows an alternating stress. The alternating stress is a half of a stress range. The stress range is a difference of a maximum stress and a minimum stress. The single flare tube 13 of this embodiment is shown by the solid line C, and the single flare tube 103 of the prior art is shown by the dotted line D. Comparing the two, the fatigue strength of the single flare tube 13 is 35% higher than the single flare tube 103.

Figure 5:
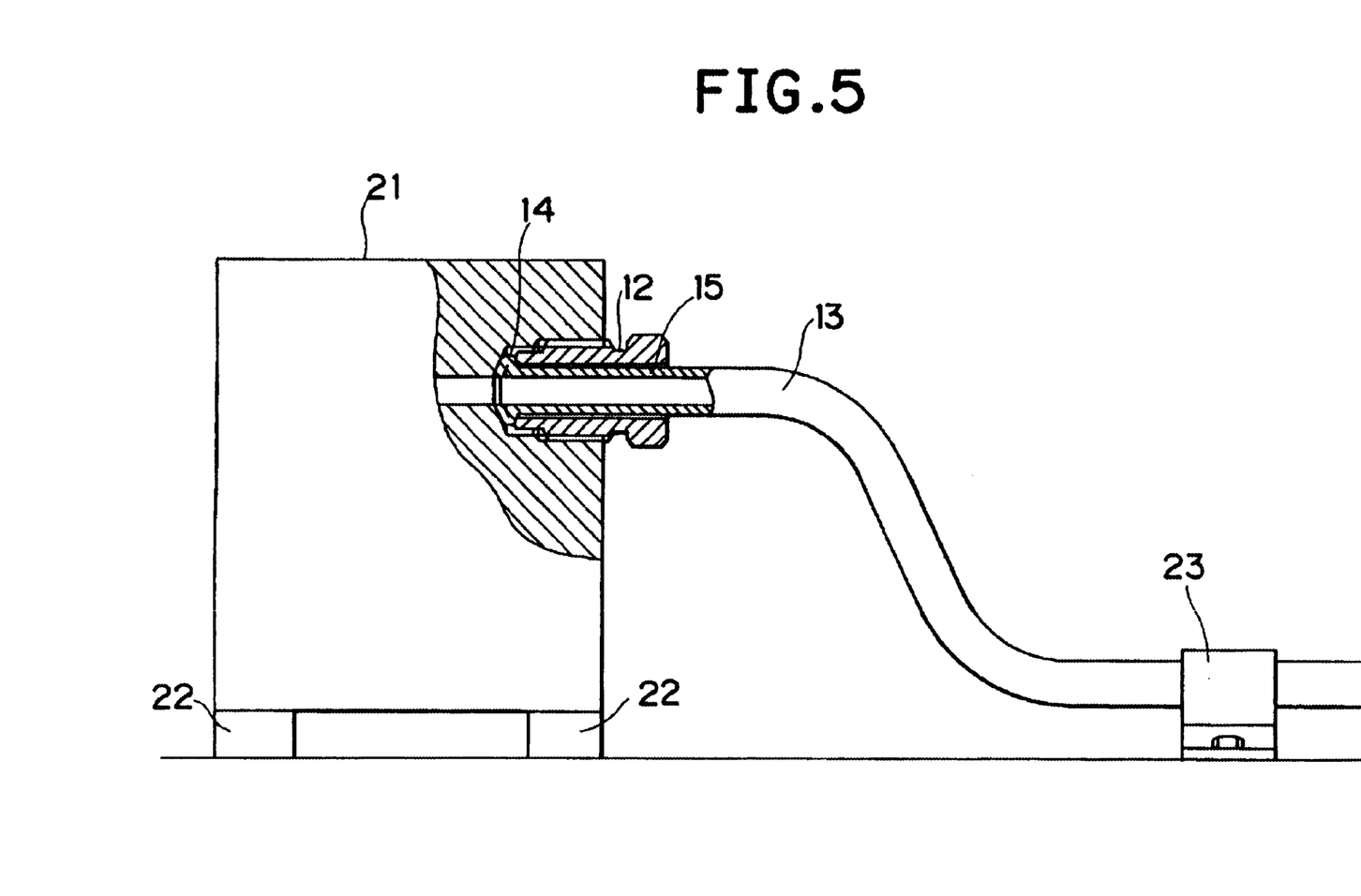
FIG. 5 is a diagrammatic view showing the joint structure of the single flare tube of FIG. 1 applied to a brake system on a vehicle.

FIG. 5 shows diagrammatically the joint structure of the single flare tube of FIG. 1 applied to a brake system on a vehicle. Referring to FIG. 5, an ABS (Antilock Brake System) actuator 21 is fixed to a body of the vehicle by way of a plurality of rubber mounts 22. The rubber mounts 22 prevent a vibration of the ABS actuator 21 from transmitting to the body of the vehicle. The single flare tube 13 is fixed to the body of the vehicle by a plurality of brackets 23 (in FIG. 5 only one bracket is shown). Pressured oil is supplied to the ABS actuator 21 by the joint structure of the single flare tube of this embodiment.

In this structure mentioned above, when the body of the vehicle vibrates, the ABS actuator 21 supported by the rubber mounts 22 and the tube 15 of the single flare tube 13 supported by the brackets 23 vibrate with respect to each other. As a consequence, a relative clearance c (see FIG. 1) between the ABS actuator 21 and the single flare tube 13 fluctuates, while that clearance c is constant in static conditions. (The clearance c is the difference between the semi-diameter of the through-hole in the flare nut 12 and the outer semi-diameter of the tube 15.) Thus, due to the vibration of the single flare tube 13, alternating tensile stress and compressive stress are loaded repeatedly on the surface of the outer corner 13a. Due to the effects of this embodiment as mentioned above, the tensile stress of the outer corner 13a hardly concentrates when the external force is loaded to the single flare tube 13. As a result, the fatigue durability of the outer corner 13a becomes high, and the durability of the single flare tube 13 is secured.

In other words, a certain level of vibration of the single flare tube 13 becomes tolerable in this embodiment. Consequently, a vibration-isolating performance from the ABS actuator 21 to the body of the vehicle can be improved by decreasing a spring rate of each rubber mount 22, and the number of the brackets 23 can be reduced and/or the size of each bracket 23 can be diminished. Many tubes are adopted in a brake system of a vehicle, and there are many joint structures of the tubes. If the number of the brackets fixing the tubes is reduced and the size of each bracket is diminished by adopting the aforementioned single flare tubes, a remarkable cost saving of the brake system can be realized. Of course this embodiment can be applied not only to a hydraulic brake system but also to other hydraulic systems, fluid systems and/or fuel systems. Consequently, the total cost saving by adopting the single flare tube of this embodiment is remarkably high.

The joint structure of the single flare tube of this invention is not only applied to piping installations of a vehicle, but also can be applied to any other piping/tubing installation, in the case where an end of a tube is fastened to a part. Additionally, non-metal could be used for the single flare tube as well as metal.

While the present invention has been described with reference to preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the invention.

What is claimed is:

1. A joint structure comprising:
   a single flare tube having a tube and a flare, the flare connecting at a flare rear end to the tube at a tube front end, the flare extending radially outward and forward from the flare rear end to form a radially outward extending part, the flare having a flare front end protruding and conically tapering forward from the radially outward extending part along an axis of the single flare tube, the flare extending rearward from the flare front end at an acute conical flare angle from the axis;
   a first connector member having a through-hole that receives the tube of the single flare tube; and
   a second connector member that couples with the first connector member, the second connector having a flare receiving surface extending rearward at a conical seal angle from the axis, wherein
   the acute conical flare angle is positive and less than the conical seal angle, and
   a width of an inner circumferential groove of the radially outward extending part of the flare is nearly zero and does not substantially change to maintain a conically tapering shape at the flare front end, when the flare front end of the flare is pushed against and coupled with the flare receiving surface of the second connector member by fastening the first and second connector members together.

2. A joint structure according to claim 1, wherein the flare rear end of the single flare tube connects the tube to the flare smoothly and continuously along an outer perimeter of the single flare tube, a first curvature radius of the outer perimeter along the axis of a longitudinal cross-section of the single flare tube is smaller than a second curvature radius of the outer perimeter along the axis of the longitudinal cross-section of the single flare tube, a point along the second curvature radius being at least as close to the axis as a point along the first curvature radius.

3. A joint structure according to claim 2, wherein a diameter of the through-hole increases at an end of the first connector member that engages the flare.

4. A joint structure according to claim 1, wherein the first connector member is a flare nut having a thread on an external surface of the flare nut, and the second connector member is a union having a thread that engages the thread on the flare nut to connect the first and second connector members together.

5. A vehicle including the joint structure of claim 1.

6. A vehicle according to claim 5, wherein the vehicle includes an anti-lock brake system, and the second connector member is attached to the anti-lock brake system.

7. A joint structure comprising:
   a single flare tube having a tube and a flare, the flare connecting at a flare rear end to the tube at a tube front end, the flare extending radially outward and forward from the flare rear end to form a radially outward extending part, the flare having a flare front end protruding and conically tapering forward from the radially outward extending part along an axis of the single flare tube, the flare extending rearward from the flare front end at an acute conical flare angle from the axis;

a first connector member having a through-hole that receives the tube of the single flare tube; and a second connector member that couples with the first connector member, the second connector having a flare receiving surface extending rearward at a conical seal angle from the axis, wherein the acute conical flare angle is positive and less than the conical seal angle, a width of a narrow portion of an inner circumferential groove of the radially outward extending part of the flare is substantially zero and stays substantially zero when the single flare tube is pushed against and coupled with the flare receiving surface of the second connector member by fastening the first and second connector members together, and a radially inner diameter of the narrow portion of the inner circumferential groove is smaller than an external diameter of the tube.

8. A joint structure according to claim 7, wherein the flare rear end of the single flare tube connects the tube to the flare smoothly and continuously along an outer perimeter of the single flare tube, a first curvature radius of the outer perimeter along the axis of a longitudinal cross-section of the single flare tube is smaller than a second curvature radius of the outer perimeter along the axis of the longitudinal cross-section of the single flare tube, a point along the second curvature radius being at least as close to the axis as a point along the first curvature radius.

9. A joint structure according to claim 8, wherein a diameter of the through-hole increases at an end of the first connector member that engages the flare.

10. A joint structure according to claim 7, wherein the first connector member is a flare nut having a thread on an external surface of the flare nut, and the second connector member is a union having a thread that engages the thread on the flare nut to connect the first and second connector members together.

11. A vehicle including the joint structure of claim 7.

12. A vehicle according to claim 11, wherein the vehicle includes an anti-lock brake system, and the second connector member is attached to the anti-lock brake system.

13. A joint structure comprising:

a single flare tube having a tube and a flare, the flare being connected at a flare rear end with the tube at a tube front end and extending radially outward along an axis, the flare extending rearward from a flare front end at an acute conical flare angle from the axis;

a first connector member having a through-hole that receives the tube of the single flare tube; and a second connector member that couples with the first connector member the second connector having a flare receiving surface extending rearward at a conical seal angle from the axis, wherein the flare rear end of the single flare tube connects the tube to the flare smoothly and continuously along an outer perimeter of the single flare tube, a first curvature radius of the outer perimeter along the axis of a longitudinal cross-section of the single flare tube is smaller than a second curvature radius of the outer perimeter along the axis the longitudinal cross-section of the single flare tube, a point along the second curvature radius being at least as close to the axis as a point along the first curvature radius.

14. A joint structure according to claim 13, wherein a diameter of the through-hole increases at an end of the first connector member that engages the flare.

15. A joint structure according to claim 13, wherein the first connector member is a flare nut having a thread on an external surface of the flare nut, and the second connector member is a union having a thread that engages the thread on the flare nut to connect the first and second connector members together.

16. A vehicle including the joint structure of claim 13.

17. A vehicle according to claim 16, wherein the vehicle includes an anti-lock brake system, and the second connector member is attached to the anti-lock brake system.

18. A hollow single flare tube connectable to a member having an aperture so that fluid can flow between the single flare tube and the member, the member having a flare receiving surface, the single flare tube comprising:

a tube and a flare, the flare connecting at a flare rear end with the tube at a tube front end, the flare extending radially outward and forward from the flare rear end to form a radially outward extending part, the flare having a flare front end protruding and conically tapering forward from the radially outward extending part along an axis of the single flare tube, the flare extending rearward from the flare front end at an acute conical flare angle from the axis;

wherein a width of an inner circumferential groove of the radially outward extending part of the flare does not substantially change regardless of the force applied to press the flare front end of the single flare tube against the flare receiving surface of the member having the aperture, and the acute conical flare angle is positive and less than a conical seal angle of the flare receiving surface.

19. A single flare tube according to claim 18, wherein the flare rear end of the single flare tube connects the tube to the flare smoothly and continuously along an outer perimeter of the single flare tube, a first curvature radius of the outer perimeter along the axis of a longitudinal cross-section of the single flare tube is smaller than a second curvature radius of the outer perimeter along the axis of the longitudinal cross-section of the single flare tube, a point along the second curvature radius being at least as close to the axis as a point along the first curvature radius.

20. A hollow single flare tube connectable to a member having an aperture so that the fluid can flow between the single flare tube and the member, the member having a flare receiving surface, the single flare tube comprising:

a tube and a flare, the flare connecting at a flare rear end with the tube at a tube front end to form a radially outward extending part, the flare having a flare front end protruding and conically tapering forward from the radially outward extending part along an axis of the single flare tube, the flare extending rearward from the flare front end at an acute conical flare angle from the axis;

wherein the flare rear end of the single flare tube connects the tube to the flare smoothly and continuously along an outer perimeter of the single flare tube, a first curvature radius of the outer perimeter along the axis of a longitudinal cross-section of the single flare tube is smaller than a second curvature radius of the outer perimeter along the axis of the longitudinal cross-section of the single flare tube, a point along the second curvature radius being at least as close to the axis as a point along the first curvature radius.

21. A hollow single flare tube according to claim 20, wherein the acute conical flare angle is positive and less than a conical seal angle of the flare receiving surface.

* * * * *